(12) United States Patent
Tosey (10) Patent No.: US 8,020,114 B2
(45) Date of Patent: Sep. 13, 2011

(54) ENTER-THEN-ACT INPUT HANDLING

(75) Inventor: Joseph Peter Robert Tosey, North Vancouver (CA)

(73) Assignee: Sierra Wireless, Inc., Richmond, B.C. (CA)

( * ) Notice: Subject to any disclaimer, the term of this patent is extended or adjusted under 35 U.S.C. 154(b) by 1216 days.

(21) Appl. No.: 10/165,598

(22) Filed: Jun. 7, 2002

(65) Prior Publication Data

US 2004/0066418 A1    Apr. 8, 2004

(51) Int. Cl.
*G06F 3/00* (2006.01)

(52) U.S. Cl. ........ 715/780; 715/764; 715/781; 715/794; 715/807

(58) Field of Classification Search .......... 715/505, 715/708, 736, 777, 764, 780, 781, 794, 807; 717/124, 125, 126, 127; 714/37–47
See application file for complete search history.

(56) References Cited

U.S. PATENT DOCUMENTS

| | | | | |
|---|---|---|---|---|
| 5,379,428 | A * | 1/1995 | Belo | 718/103 |
| 5,396,264 | A * | 3/1995 | Falcone et al. | 715/811 |
| 5,621,903 | A | 4/1997 | Luciw et al. | 395/326 |
| 5,748,974 | A | 5/1998 | Johnson | 395/759 |
| 5,845,257 | A * | 12/1998 | Fu et al. | 705/8 |
| 6,072,781 | A * | 6/2000 | Feeney et al. | 370/282 |
| 6,232,970 | B1 * | 5/2001 | Bodnar et al. | 715/708 |
| 6,233,559 | B1 | 5/2001 | Balakrishnan | 704/275 |
| 6,292,743 | B1 * | 9/2001 | Pu et al. | 701/202 |
| 6,366,297 | B1 * | 4/2002 | Feagans | 715/736 |
| 6,934,934 | B1 * | 8/2005 | Osborne et al. | 717/126 |
| 6,993,747 | B1 * | 1/2006 | Friedman | 717/124 |
| 7,165,251 | B2 * | 1/2007 | Kuroda et al. | 718/100 |
| 2003/0046401 | A1 * | 3/2003 | Abbott et al. | 709/228 |
| 2003/0214657 | A1 * | 11/2003 | Stringham | 358/1.1 |
| 2005/0021819 | A1 * | 1/2005 | Kilkki | 709/232 |
| 2005/0050544 | A1 * | 3/2005 | Saito et al. | 718/103 |

OTHER PUBLICATIONS

Nardi, Bonnie A., "Collaborative, Programmable Intelligent Agents", Communications of the Association for Computing Machinery, Association for Computing Machinery, New York, US, vol. 41, No. 3, pp. 96-104 (Mar. 1, 1998).
PCT/CA03/00825, Invitation to Pay Additional Fees w/ annexed partial International Search Report, dated Nov. 19, 2004.

* cited by examiner

*Primary Examiner* — Weilun Lo
*Assistant Examiner* — Mylinh Tran
(74) *Attorney, Agent, or Firm* — Nixon Peabody LLP (57) ABSTRACT

The present invention utilizes input handling to provide enter-then-act capability for user inputs. User inputs are received, and a set of one or more secondary applications are executed using the input. A priority rating may then be calculated for each of the one or more secondary applications in the set, the priority rating indicating how pertinent the input was to a corresponding application.

46 Claims, 6 Drawing Sheets

| Input Window | | Contact Manager | | Calculator | | Stock Quote Program | | Secondary Output Window | |
| --- | --- | --- | --- | --- | --- | --- | --- | --- | --- |
| User Types | Window State | Priority | Window State | Priority | Window State | Priority | Window State | Application | Window State |
| S | S | 100 | Rick<br>Sam<br>Sue<br>Todd<br>... | 0 | | 50 | SA/<br>SubAmerica<br><br>SB/<br>SuperBad<br><br>SW/<br>Sierra<br>Wireless | Contact<br>Manager | Rick<br>Sam<br>Sue<br>Todd<br>... |
| W | SW | 0 | | | | 100 | SW/<br>Sierra<br>Wireless | Stock<br>Quote<br>Program | SW/<br>Sierra<br>Wireless |
| <Del> | S | 100 | Rick<br>Sam<br>Sue<br>Todd<br>... | 0 | | 50 | SA/<br>SubAmerica<br><br>SB/<br>SuperBad<br><br>SW/<br>Sierra<br>Wireless | Contact<br>Manager | Rick<br>Sam<br>Sue<br>Todd<br>... |
| <Del> | | 100 | Rick<br>Sam<br>Sue<br>Todd<br>... | 0 | | 0 | | Contact<br>Manager | Rick<br>Sam<br>Sue<br>Todd<br>... |
| 1 | 1 | 0 | | 100 | 1=1 | 0 | | Calculator | 1 |
| + | 1+ | 0 | | 100 | 1+ | 0 | | Calculator | 1+ |
| 1 | 1+1 | 0 | | 100 | 1+1=2 | 0 | | Calculator | 1+1=2 |
| <CR> | 1+1 | 0 | | 100 | 1+1=2 | 0 | | Calculator | 1+1=2 |
| <5> | 1+1<br>5 | 0 | | 100 | 1+1=2<br>5 | 0 | | Calculator | 1+1=2<br>5 |
| % | 1+1<br>5% | 0 | | 100 | 1+1=2<br>5%=0.1 | 0 | | Calculator | 1+1=2<br>5%=0.1 |

ENTER-THEN-ACT INPUT HANDLING

FIELD OF THE INVENTION

The present invention relates to the field of software used on mobile devices. More particularly, the present invention relates to the handling of inputs to the mobile devices.

BACKGROUND OF THE INVENTION

Mobile devices, such as cellular phones and personal digital assistants (PDAs) have been growing in popularity for many years. As they have grown in complexity, the number of functions they are capable of running has also increased. Cellular phones are no longer limited to merely dialing and receiving phone numbers. Address books, calculators, memo pads, and email capabilities are only a few of the functions being implemented on mobile devices. A problem, however, occurs when attempting to input information to these various functions.

People tend to think of information in terms of words, ideas, and pictures, but current operating systems work in terms of programs. A user must first select an authoring program (Word, Excel, address book, calculator, etc.) before entering the data. This is inconvenience because it implies that the user has decided how to use the information being recorded before it is actually recorded. If the information is later repurposed, it must be cut-and-pasted into a different program or function.

In the casual, mobile environment, cutting-and-pasting is very inconvenient. As a result, people continue to use old fashioned mechanisms to quickly scribble down ideas, such as Post It notes and scrap paper. Even on personal digital assistants, the memo pad requires that the user open a new memo, enter the data, and then cut-and-paste the data to where it should go. This is a slow, awkward, and unintuitive process, and therefore it is seldom used.

What is needed is a solution which allows an individual to enter a thought and then choose what he wants to do with it with a minimum of interaction.

BRIEF DESCRIPTION OF THE INVENTION

The present invention utilizes input handling to provide enter-then-act capability for user inputs. User inputs are received, and a set of one or more secondary applications are executed using the input. A priority rating may then be calculated for each of the one or more secondary applications in the set, the priority rating indicating how pertinent the input was to a corresponding application.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes input handling to provide enter-then-act capability for user inputs. A input portion, called an Input Window, may be used to allow a user to directly input text or draw, in the same way a person would print text or draw on a piece of paper. The input window may provide feedback that data is being entered, such as displaying characters on the display. This allows the user to have the same ease of data entry as in a word processor.

A set of secondary applications may monitor this data entry process. These targeted applications "listen" to the events generated by the end user (character input and text editing events, for example) and optionally retrieve the data modeled by the input window. Each secondary application may compute an output as if the user were entering data directly into it.

Each secondary application may then produce a quantitative priority rating that may be used to determine how pertinent the input was to the application. The secondary application with the highest priority may be displayed automatically, in a second output window, or the user may select one or more secondary applications (perhaps ordered in a list by priority rating). Alternatively, the user may be provided with information as to the secondary application with the highest priority rating and asked to confirm that it should be selected.

Figure 1:
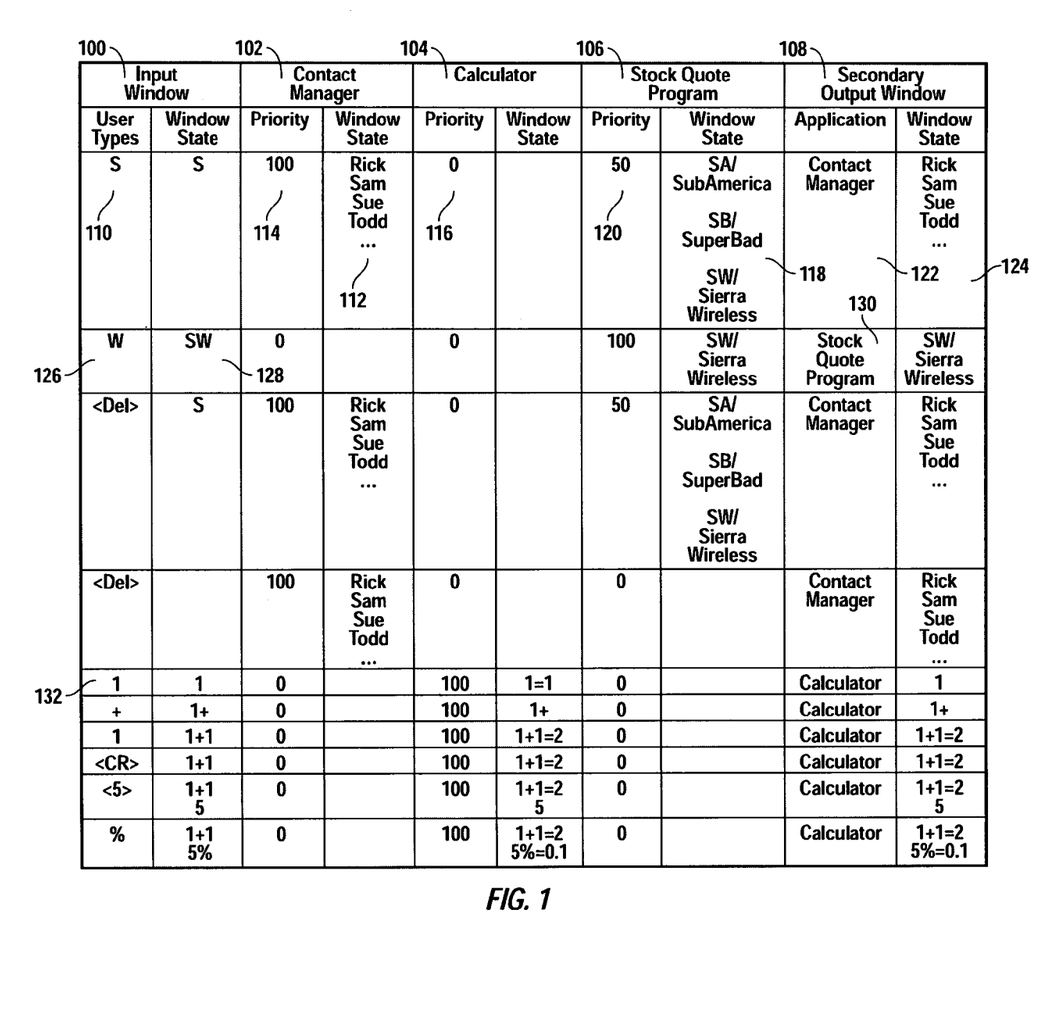
FIG. 1 is a diagram illustrating an example table of user inputs and accompanying responses by secondary applications in accordance with a specific embodiment of the present invention.

For example, the user may start with an empty input window, and secondary applications such as a contact manager, calculator, and stock quotes. One of ordinary skill in the art will recognize that a large number of possible secondary applications can be utilized that sort or filter database based on the input window, or form a computation based on data in the input window. FIG. 1 is a diagram illustrating an example table of user inputs and accompanying responses by secondary applications in accordance with a specific embodiment of the present invention. The input window 100 is provided to allow a user to enter input information. A contact manager 102 may be an address book or similar personal data compilation program. A calculator 104 may be used to perform mathematical calculations. A stock quote program 106 may indicate stock price information upon receiving a stock symbol. Finally, a secondary output window 108 may provide the output of whatever secondary application the user elects to run (or the one with the highest priority rating, if the user chooses to have no intervention in that decision).

First a user types an "S" 110 into the input window 100. The contact manager 102 executes using the input S, and returns a location in the contact list. Namely, the list of names that begin with S along with surrounding names if space permits 112. Since the address book was successful in utilizing the input without requiring additional user input, it assigns a priority rating of 100 in location 114 (which, in this example, is the highest rating). The calculator 104, on the other hand, attempts to run using the input "S" but cannot produce any result since it is not numerical data. Thus, it returns a priority rating of 0 in location 116. The stock quote program 106 executes using the input S, but cannot determine what stock is being identified. There are many choices of stock symbols beginning with the letter S and none that is precisely the letter S. Thus, for example, there may be three possible choices 118. This requires additional user intervention, although the program was able to execute using the S symbol and at least narrow the choices. Therefore, it assigns a priority rating of 50 in location 120.

Now, it can be determined that the address book has the highest priority rating at this point, and therefore a prompt may be provided to the user which indicates such and asks whether he agrees that the address book is the program to use. Alternatively, however, the software can simply assume he wants the secondary application with the highest priority rating and use that to produce the output. For simplicity, for the rest of this example, it will be assumed that the user desires no intervention and allows the software to determine the most appropriate program on its own. Therefore, in the secondary output window 120, the choice of application 122 is the contact manager, and the output is the output of the contact manager 124.

Next a user may type "W" 126 into the input window 100. This results in a combined input of "SW" 128. The address book 102 may attempt to execute using this input, but it finds no contact beginning with "SW". Therefore, it returns a priority rating of 0. The calculator, once again, cannot perform any computations because there is no numerical input. Thus, it also returns a priority rating of 0. The stock quote program 106, on the other hand, is able to locate a single stock ("Sierra Wireless") that has a stock symbol beginning with SW. Thus, it returns a priority rating of 100. The secondary output window 120 then displays the output of the choice of application 130 as stock quote program, displaying the accompanying stock price information.

Next a user may type the <Del> key, deleting the "W" from the input window. At this point, the priority ratings will be identical to how they were when the user initially typed "S", thus resulting in the output of the contact manager 102 being displayed in the secondary output window 120. The user may then type the <Del> key again, this time deleting the "S" from the input window. At this point, the input window is blank. For simplicity, the software may at that point choose simply to assign the priority ratings used in the previous step (i.e., as if there was an "S" in the input window). However, one of ordinary skill in the art will recognize that there may be many ways to handle such a situation, including not displaying any secondary output.

With an empty input window, the user may now choose to enter numerical data. A "1" 132 may be typed into the input window 100. The contact manager 102, requiring alphabetical symbols only, is not able to execute using this input, and thus returns a priority rating of 0. The calculator 104, on the other hand, is able to execute using this input. The calculator indicates that 1=1 and assigns a priority rating of 100. The stock quote program 106, like the contact manager 102, is unable to execute using numerical inputs, thus returning a priority rating of 0. Since the calculator has the highest priority rating, its results are displayed in the secondary output window. This continues as a "+", another "1", a <CR>, a "5" and a "%" are input, indicating 1+1 and then the taking of 5% of that result. The resulting value is 0.1 and is displayed in the secondary output window.

Figure 2:
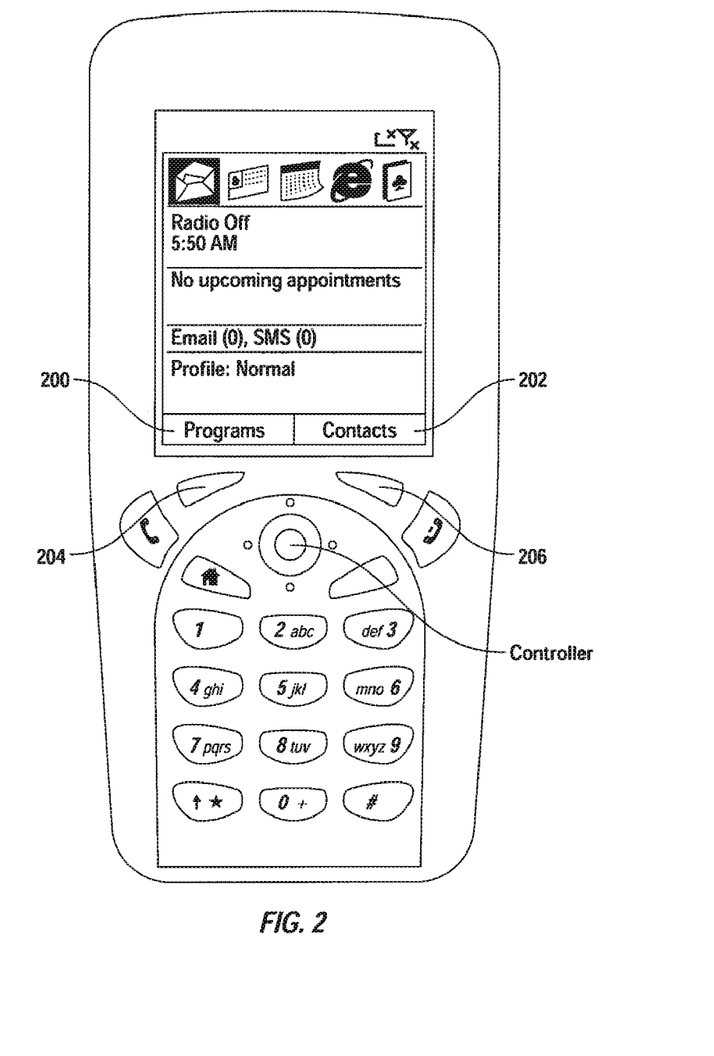
FIG. 2 is a diagram illustrating a typical smart phone.
Figure 3:
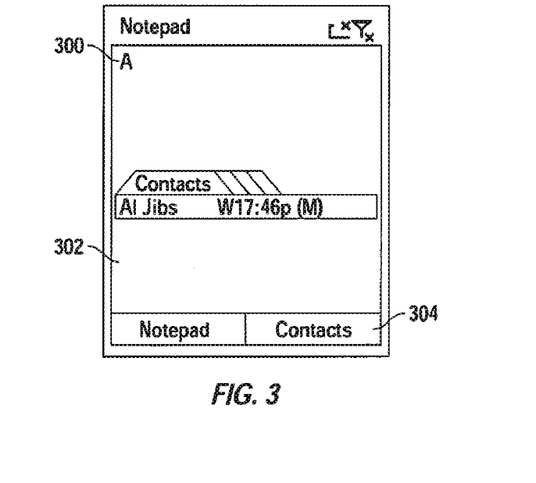
FIG. 3 is a diagram illustrating a screen shot showing an example of a smart phone display in accordance with a specific embodiment of the present invention.

Functionally, therefore, its as if the user were simultaneously typing into the input window and each secondary application simultaneously. Each secondary application may further provide its own menu of options that defines how the computed output may be used. For each displayed output, the corresponding menu of operations is displayed. As an example, the menu shown for the input window may contain the following items, which are appropriate optinos for a simple line of text input:

Send as:
email message
instant message
text message (SMS)
Save as:
calendar item
contact info
task
note
Add to:
Gift Ideas (or other memo)
Shopping List (or other itemized list)
Expense Account (or other database)
The contact manager menu may contain the following items:
Phone:
Work
Home
Mobile
Contact Via:
Email
Instant Message
Text Message Schedule:
Calender Item
Tasks
The Stock quote application may provide options such as:
Lookup:
Stock Price
Stock Graph
Recent News
Financial Reports
Add to:
Personal Portfolio
Club Portfolio
Tech Portfolio
Alert List
Cancel Alerts
Remove from portfolios Furthermore, a smart phone, for example, may provide two menu selections under its screen for use with Wireless Application Protocol (WAP) applications. FIG. 2 is a diagram illustrating a typical smart phone. A button labeled "Programs" 200 and a button labeled "Contacts" 202 may be provided. These buttons labels, however, can be modified by the software to display any labels, thus mapping the corresponding buttons 204, 206 to the new labels. In a specific embodiment of the present invention, the system may display the input window on part of a smart phone screen, and map its menu to one of the menu buttons under the phone. It may then map the menu of the currently selected secondary application to the other menu button under the screen. FIG. 3 is a diagram illustrating a screen shot showing an example of a smart phone display in accordance with a specific embodiment of the present invention. If the letter "A" 300 is typed into a notepad, it may be determined that the contact manager has the highest priority rating. Thus, the contacts window may be displayed in the secondary output window 302, and the button label 304 may be changed to "Contacts". Selecting the button corresponding to "Notepad" results in menu options for the notepad appearing on the screen, whereas selecting the button corresponding to "contacts" results in the menu options for the contact manager appearing on the screen.

Figure 4:
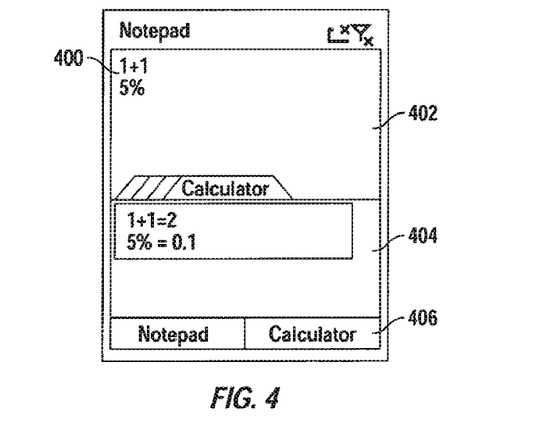
FIG. 4 is a diagram illustrating a screen shot showing another example of a smart phone display in accordance with a specific embodiment of the present invention.

FIG. 4 is a diagram illustrating a screen shot showing another example of a smart phone display in accordance with a specific embodiment of the present invention. If the characters "1+1<CR>5%" 400 are typed in the input window 402, the calculator application is deemed to have the highest priority rating. Thus, the calculator window may appear in the secondary output window 404, and the mapping of the second button may be changed from "Contacts" to "Calculator" 406.

Referring back to FIG. 3, in accordance with a specific embodiment of the present invention, a contact's current time reference 306 may be displayed. This is accomplished for the contacts that have dialing codes that are limited to a single time zone. For instance, if the contact's service area is "604", the smart phone may display the current time in the 604 area code in the contact's display. If the contact has a non-North American country code (such as UK +44), the time could be adjusted accordingly. Either the day of the week or date could be used to show dateline crossings.

Figure 5:
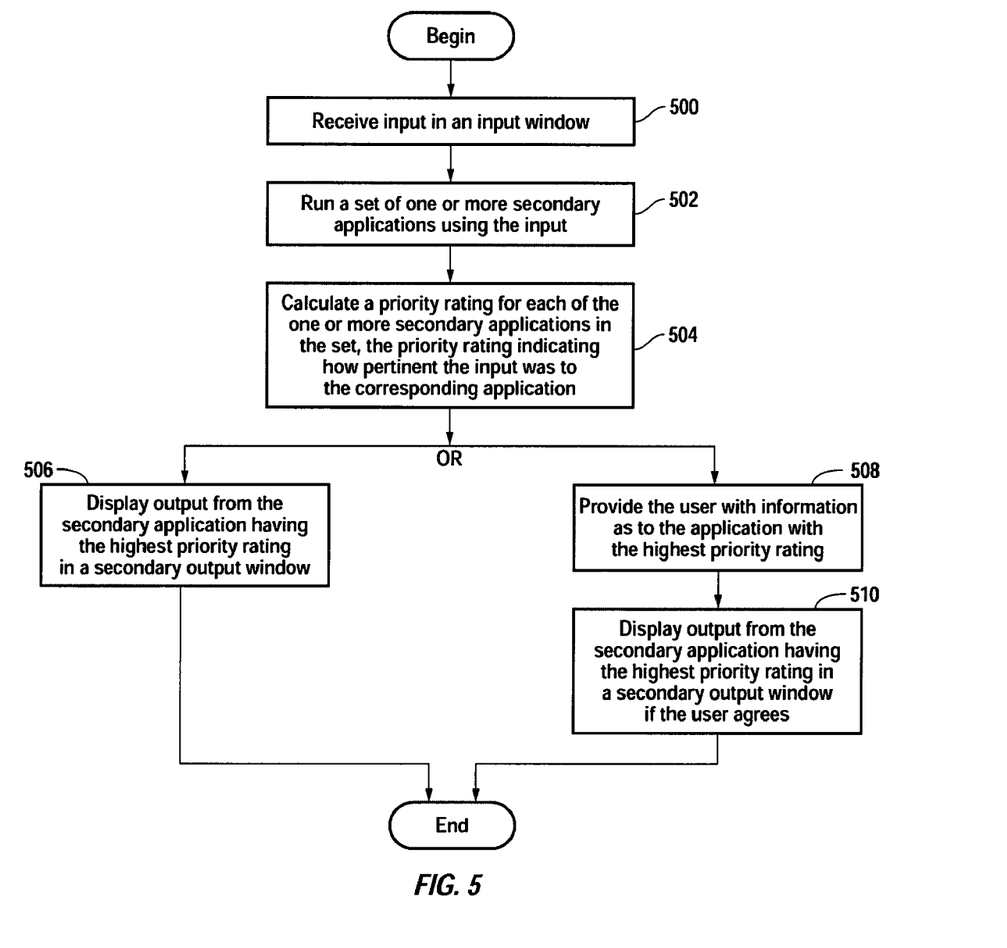
FIG. 5 is a flow diagram illustrating a method for handling user input in accordance with a specific embodiment of the present invention.

FIG. 5 is a flow diagram illustrating a method for handling user input in accordance with a specific embodiment of the present invention. At 500, input is received in an input window. This may be, for example, a notepad application. At 502, a set of one or more secondary applications is run using the input. At 504, a priority rating is calculated for each of the one or more secondary applications in the set, the priority rating indicating how pertinent the input was to the corresponding application. The priority rating may be set at a high rating if the corresponding secondary application ran successfully with the input and does not require additional user intervention. The priority rating may be set to a medium rating if the corresponding secondary application ran successfully with the input but requires additional user intervention. The priority rating may be set to a low rating if the corresponding secondary application did not run successfully with the input. At 506, output from the secondary application having the highest priority rating may be displayed in a secondary output window. Alternatively, at 508 the user may be provided with information as to the application with the highest priority rating and at 510, the output from the secondary application having the highest priority rating may be displayed in a secondary output window if the user agrees.

Figure 6:
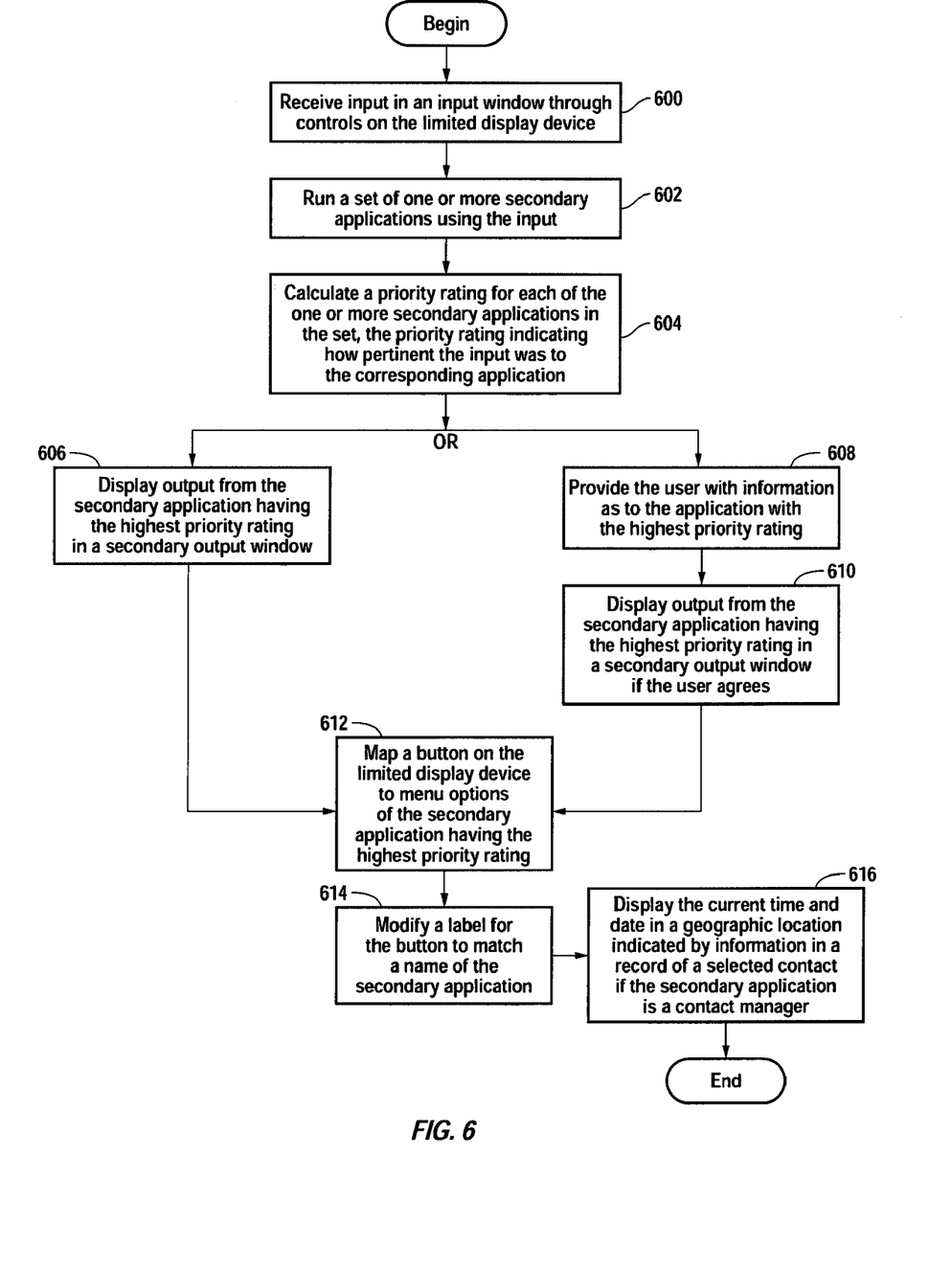
FIG. 6 is a flow diagram illustrating a method for handling user input to a limited display device in accordance with a specific embodiment of the present invention.

FIG. 6 is a flow diagram illustrating a method for handling user input to a limited display device in accordance with a specific embodiment of the present invention. At 600, input is received in an input window through controls on the limited display device. The input window may be, for example, a notepad application, and the controls may be, for example, a stylus, a scroll wheel, a navigation bar, or a navigation pad. At 602, a set of one or more secondary applications is run using the input. At 604, a priority rating is calculated for each of the one or more secondary applications in the set, the priority rating indicating how pertinent the input was to the corresponding application. The priority rating may be set at a high rating if the corresponding secondary application ran successfully with the input and does not require additional user intervention. The priority rating may be set to a medium rating if the corresponding secondary application ran successfully with the input but requires additional user intervention. The priority rating may be set to a low rating if the corresponding secondary application did not run successfully with the input. At 606, output from the secondary application having the highest priority rating may be displayed in a secondary output window. Alternatively, at 608 the user may be provided with information as to the application with the highest priority rating and at 610, the output from the secondary application having the highest priority rating may be displayed in a secondary output window if the user agrees.

At 612, a button on the limited display device may be mapped to menu options of the secondary application having the highest priority rating. At 614, a label for the button may be modified to match a name of the secondary application. At 616, if the secondary application is a contact manager, the current time and date in a geographic location indicated by information in a record of a selected contact may be displayed. This may be determined by utilizing the current time in the user's location and modifying the time ahead or behind according to a mapping of area code information to time zone.

Figure 7:
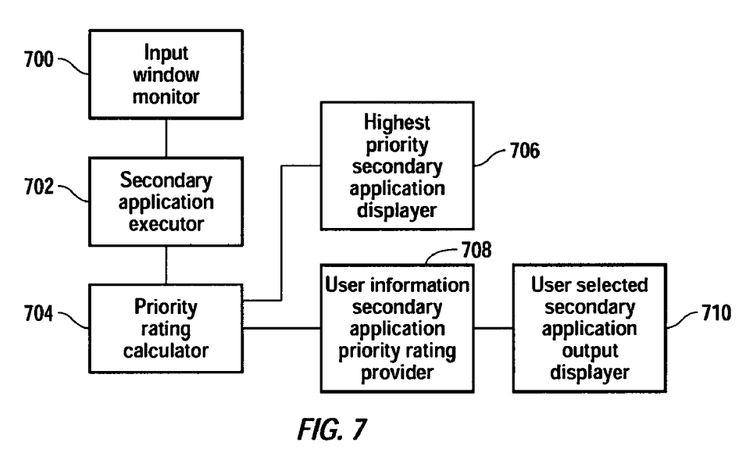
FIG. 7 is a block diagram illustrating an apparatus for handling user input in accordance with a specific embodiment of the present invention.

FIG. 7 is a block diagram illustrating an apparatus for handling user input in accordance with a specific embodiment of the present invention. An input window monitor 700 may monitor input received in an input window. The input window may be, for example, a notepad application. A secondary application executor 702 coupled to the input window monitor 700 may run a set of one or more secondary applications using the input. A secondary application priority rating calculator 704 coupled to the secondary application executor 702 may calculate priority rating for each of the one or more secondary applications in the set, the priority rating indicating how pertinent the input was to the corresponding application. The priority rating may be set at a high rating if the corresponding secondary application ran successfully with the input and does not require additional user intervention. The priority rating may be set to a medium rating if the corresponding secondary application ran successfully with the input but requires additional user intervention. The priority rating may be set to a low rating if the corresponding secondary application did not run successfully with the input. A highest priority secondary application output displayer 706 coupled to the secondary application priority rating calculator 704 may display output from the secondary application having the highest priority rating in a secondary output window. Alternatively, a user information secondary application priority rating provider 708 coupled to the secondary application priority rating calculator 704 may provide the user with information as to the application with the highest priority rating. Then a user selected secondary application output displayer 710 coupled to the user information secondary application priority rating provider 708 may display the output from the secondary application having the highest priority rating in a secondary output window if the user agrees.

Figure 8:
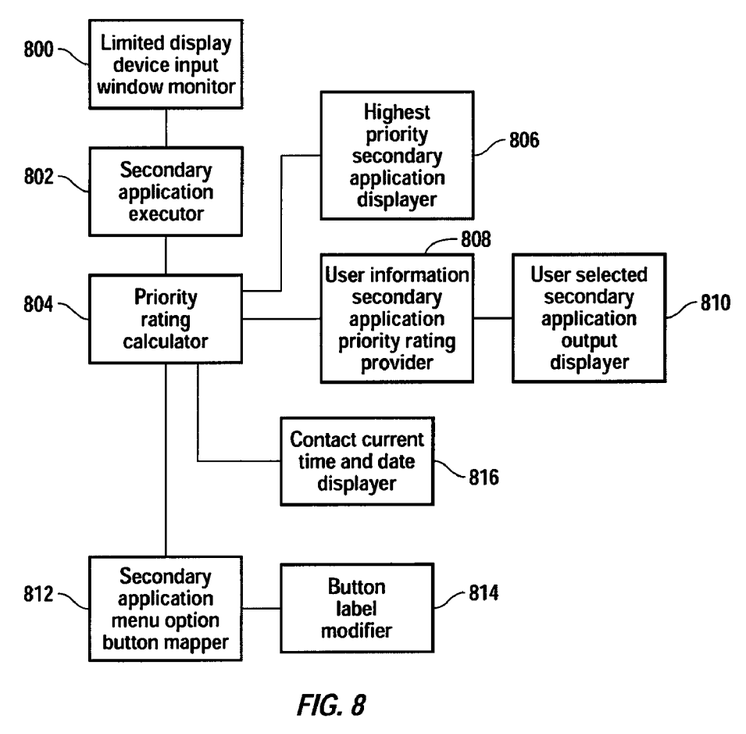
FIG. 8 is a block diagram illustrating an apparatus for handling user input to a limited display device in accordance with a specific embodiment of the present invention.

FIG. 8 is a block diagram illustrating an apparatus for handling user input to a limited display device in accordance with a specific embodiment of the present invention. A limited display device input window monitor 800 may monitor input received in an input window through controls on the limited display device. The input window may be, for example, a notepad application, and the controls may be, for example, a stylus, a scroll wheel, a navigation bar, or a navigation pad. A secondary application executor 802 coupled to the limited display device input window monitor 800 may run a set of one or more secondary applications using the input. A secondary application priority rating calculator 804 coupled to the secondary application executor 802 may calculate a priority rating for each of the one or more secondary applications in the set, the priority rating indicating how pertinent the input was to the corresponding application. The priority rating may be set at a high rating if the corresponding secondary application ran successfully with the input and does not require additional user intervention. The priority rating may be set to a medium rating if the corresponding secondary application ran successfully with the input but requires additional user intervention. The priority rating may be set to a low rating if the corresponding secondary application did not run successfully with the input. A highest priority secondary application output displayer 806 coupled to the secondary application priority rating calculator 804 may display output from the secondary application having the highest priority rating in a secondary output window. Alternatively, a user information secondary application priority rating provider 808 coupled to the secondary application priority rating calculator 804 may provide the user with information as to the application with the highest priority rating. A user selected secondary application output displayer 810 coupled to the user information secondary application priority rating provider 808 may then display the output from the secondary application having the highest priority rating in a secondary output window if the user agrees.

A secondary application menu option button mapper 812 coupled to the secondary application priority rating calculator 804 may map a button on the limited display device to menu options of the secondary application having the highest priority rating. A button label modifier 814 coupled to said secondary application menu option button mapper 812 may modify a label for the button to match a name of the secondary application. If the secondary application is a contact manager, a contact current time and date displayer 816 coupled to the secondary application priority rating calculator 804 may display the current time and date in a geographic locations indicated by information in a record of a selected contact. This may be determined by utilizing the current time in the user's location and modifying the time ahead or behind according to a mapping of area code information to time zone.

One of ordinary skill in the art would recognize that many different secondary applications could be defined, including but not limited to matches for news, weather, sporting scores, customer relationship manager (CRM) or enterprise resource planning (ERP) data views, white pages, yellow pages, and many other mobile application ideas. One of ordinary skill in the art would also recognize that both the input window and secondary applications could display data in any representation suitable for the media on which they operate, including but not limited to prose, mathematical formulations, lists, images, maps, charts, sound, video, or some combination of the above.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
receiving an input and displaying an input in an input window of a first application;
running a set of one or more secondary applications in response to the input;
computing a set of one or more tentative outputs corresponding to the set of one or more secondary applications in response to the input; and
calculating a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

2. The method of claim 1, further comprising displaying output from the secondary application having the highest priority rating in a secondary output window.

3. The method of claim 1, further comprising providing the user with information as to the application with the highest priority rating.

4. The method of claim 3, further comprising displaying output from the secondary application having the highest priority rating in a secondary output window if the user agrees.

5. The method of claim 1, wherein the generating high rating further includes displaying an output of the corresponding secondary application without additional user intervention.

6. The method of claim 5, wherein the priority rating is at a low rating if the corresponding secondary application did not run successfully with the input.

7. A computer implemented method comprising:
receiving an input in an input window of a first application through controls on a limited display device;
running a set of one or more secondary applications using the input;
computing a set of one or more tentative outputs corresponding to the set of one or more secondary applications in response to the input; and calculating a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

8. The method of claim 7, further comprising displaying output from the secondary application having the highest priority rating in a secondary output window.

9. The method of claim 8, further comprising mapping a button on the limited display device to menu options of the secondary application having the highest priority rating.

10. The method of claim 9, further comprising modifying a label for the button to match a name of the secondary application.

11. The method of claim 8, wherein the generating high rating further includes displaying an output of the corresponding secondary application without additional user intervention.

12. The method of claim 8, wherein the priority rating is at a low rating if the corresponding secondary application did not run successfully with the input.

13. The method of claim 7, further comprising providing the user with information as to the application with the highest priority rating.

14. The method of claim 13, further comprising displaying output from the secondary application having the highest priority rating in a secondary output window if the user agrees.

15. The method of claim 13, wherein the displaying includes displaying the current time and date in a geographic location indicated by information in a record of a selected contact if the secondary application with the highest rating is a contact manager.

16. The method of claim 15, wherein the current time and date is determined by utilizing the current time in the user's location and modifying the time ahead or behind according to a mapping of area code information to time zone.

17. An apparatus comprising:
a memory; and
one or more processors configured to:
receive an input and displaying an input in an input window of a first application;
run a set of one or more secondary applications in response to the input;
compute a set of one or more tentative outputs corresponding to the set of one or more secondary applications in response to the input; and
calculate a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

18. The apparatus of claim 17, further comprising a highest priority secondary application output displayer coupled to the secondary application priority rating calculator.

19. The apparatus of claim 17, further comprising a user information secondary application priority rating provider coupled to the secondary application priority rating calculator.

20. The apparatus of claim 19, further comprising a user selected secondary application output displayer coupled to the user information secondary application priority rating provider.

21. An apparatus comprising:
a memory; and
one or more processors configured to:
receive an input in an input window of a first application through controls on a limited display device;
run a set of one or more secondary applications using the input;
compute a set of one or more tentative outputs corresponding to the set of one or more secondary applications in response to the input; and
calculate a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

22. The apparatus of claim 21, further comprising a highest priority secondary application output displayer coupled to the secondary application priority rating calculator.

23. The apparatus of claim 21, further comprising a user information secondary application priority rating provider coupled to the secondary application priority rating calculator.

24. The apparatus of claim 23, further comprising a user selected secondary application output displayer coupled to the user information secondary application priority rating provider.

25. The apparatus of claim 21, further comprising a secondary application menu option button mapper coupled to the a secondary application priority rating calculator.

26. The apparatus of claim 25, further comprising a button label modifier coupled to the secondary application menu option button mapper.

27. The apparatus of claim 21, further comprising a contact current time and date displayer coupled to the secondary application priority rating calculator.

28. An apparatus comprising:
means for receiving an input in an input window of a first application;
means for running a set of one or more secondary applications in response to the input;
means for computing a set of one or more tentative outputs corresponding to the set of one or more secondary applications in response to the input; and
means for calculating a priority rating for each of the one or more secondary applications in response to the set of one or more tentative outputs and the input, the priority rating
indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

29. The apparatus of claim 28, further comprising means for displaying output from the secondary application having the highest priority rating in a secondary output window.

30. The apparatus of claim 28, further comprising means for providing the user with information as to the application with the highest priority rating.

31. The apparatus of claim 30, further comprising means for displaying output from the secondary application having the highest priority rating in a secondary output window if the user agrees.

32. The apparatus of claim 28, wherein the priority rating is at a high rating if the corresponding secondary application ran successfully with the input and does not require additional user intervention.

33. The apparatus of claim 28, wherein the priority rating is at a medium rating if the corresponding secondary application ran successfully with the input but requires additional user intervention.

34. The apparatus of claim 28, wherein the priority rating is at a low rating if the corresponding secondary application did not run successfully with the input.

35. An apparatus comprising:
  means for receiving an input in an input window of a first application through controls on a limited display device;
  means for running a set of one or more secondary applications using the input;
  means for computing a set of one or more tentative outputs corresponding to the set of one or more secondary applications in response to the input; and
  means for calculating a priority rating for each of the one or more secondary applications in response to the set of one or more corresponding tentative outputs, the priority rating means for indicating how pertinent the input was to a corresponding secondary application, wherein the means for calculating a priority rating further includes means for generating a high rating if the corresponding secondary application ran successfully with the input, and a medium rating if the corresponding secondary application ran successfully with the input and requiring additional user intervention.

36. The apparatus of claim 35, further comprising means for displaying output from the secondary application having the highest priority rating in a secondary output window.

37. The apparatus of claim 35, further comprising means for providing the user with information as to the application with the highest priority rating.

38. The apparatus of claim 37, further comprising means for displaying output from the secondary application having the highest priority rating in a secondary output window if the user agrees.

39. The apparatus of claim 35, further comprising means for mapping a button on the limited display device to menu options of the secondary application having the highest priority rating.

40. The apparatus of claim 39, further comprising means for modifying a label for the button to match a name of the secondary application.

41. The apparatus of claim 35, wherein the means for displaying includes means for displaying the current time and date in a geographic location indicated by information in a record of a selected contact if the secondary application with the highest rating is a contact manager.

42. The apparatus of claim 41, wherein the current time and date is determined by utilizing the current time in the user's location and modifying the time ahead or behind according to a mapping of area code information to time zone.

43. The apparatus of claim 35, wherein the means for generating high rating further includes means for displaying an output of the corresponding secondary application without additional user intervention.

44. The apparatus of claim 35, wherein the priority rating is at a low rating if the corresponding secondary application did not run successfully with the input.

45. A program storage device readable by a machine, tangibly embodying a program of instructions executable by the machine to perform a method, the method comprising:
  receiving an input and displaying the input in an input window of a first application;
  running a set of one or more secondary applications in response to the input;
  computing a set of one or more tentative outputs corresponding to the set of one or more secondary applications in response to the input; and
  calculating a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

46. A program storage device readable by a machine, tangibly embodying a program of instructions executable by the machine to perform a method, the method comprising:
  receiving an input in an input window of a first application through controls on a limited display device;
  running a set of one or more secondary applications using the input;
  computing a set of one or more tentative outputs corresponding to the set of one or more secondary applications in response to the input;
  calculating a priority rating for each of the one or more secondary applications in response to the set of one or more corresponding tentative outputs and the input, the priority rating indicating how pertinent the input was to a corresponding secondary application, wherein the calculating a priority rating further includes generating a high rating if the corresponding secondary application ran successfully with the input, and a medium rating if the corresponding secondary application ran successfully with the input and requiring additional user intervention.

* * * * *